Dec. 4, 1962   K. LARCHÉ   3,066,975
MOVABLE ROOF STRUCTURES FOR AUTOMOBILES OR THE LIKE
Filed Oct. 7, 1959
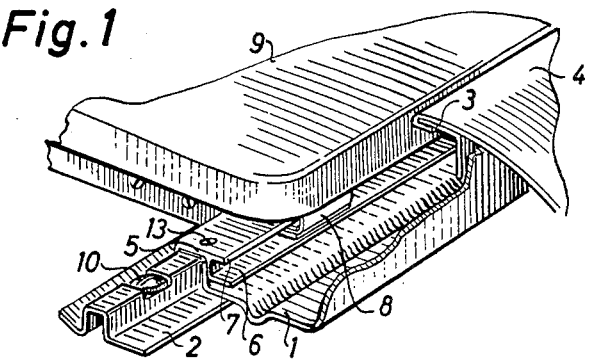
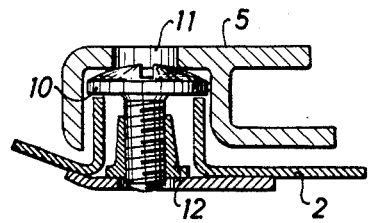
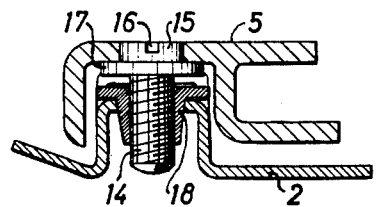
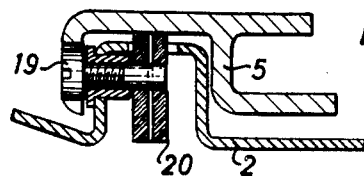
Inventor
Kurt Larché
By
Michael S. Striker
Attorney

United States Patent Office 3,066,975
Patented Dec. 4, 1962

3,066,975
MOVABLE ROOF STRUCTURES FOR AUTOMOBILES OR THE LIKE
Kurt Larché, Munich-Pasing, Germany, assignor to Wilhelm Baier K.G., Stockdorf near Munich, Germany
Filed Oct. 7, 1959, Ser. No. 844,953
Claims priority, application Germany Oct. 18, 1958
8 Claims. (Cl. 296—137)

The present invention relates to movable roof assemblies.

For example, it is known by our French Patent No. 1,113,329, to provide vehicles such as automobiles with shiftable roof sections which can be shifted from a closed position where the roof is entirely closed to an open position where at least part of the roof is open. The shiftable roof section can be shifted from its closed position to an open position where a part of the shiftable roof section is located beneath a stationary part of the roof.

Suitable guides are provided on the frame of the movable roof assembly for guiding the movable roof section for movement between its open and closed positions, and because of the curvature of the roof it is necessary for the movable roof section to have its curvature conform closely to the curvature of the frame which supports the movable roof section. Such a movable roof section includes a slide member which slides along a guide rail, and thus the elevation of the movable roof section depends upon the elevation of the slide member and the rail which cooperates with the slide member.

It has been found in practice that because of the curvature of the frame and roof section it is extremely difficult to provide a structure where the movable roof section has its curavture conforming exactly to the curvature of the frame, and the result is that further adjustments and repairs are necessary not only when the roof is relatively new but also during the life of the structure.

It is therefore a primary object of the present invention to provide a roof structure of the above type which will not require extensive costly adjustments to be made in order to provide an assembly where the curvature of the movable roof section conforms to that of the stationary part of the roof.

A further object of the present invention is to provide a structure of the above type wherein an exceedingly simple means is provided for adjusting a guide rail so as to guarantee that the roof section is at the proper elevation.

Another object of the present invention is to provide a structure of the above type wherein an adjusting means is easily accessible and can be very quickly and conveniently operated so as to provide the desired adjustment.

With the above objects in view the present invention includes in a movable roof assembly of an automobile or the like an elongated guide rail which guides a movable roof section for movement and a means which cooperates with this guide rail to adjust the elevation of the latter, this latter means preferably cooperating with a portion of the guide rail which is located adjacent to the front end of the frame which supports the movable roof section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary illustration of part of a movable roof assembly according to the present invention;

FIG. 2 shows on an enlarged scale a transverse section of a guide rail and a support structure as well as an adjusting structure of the present invention;

FIG. 3 shows a different embodiment of the structure of FIG. 2; and

FIG. 4 shows still a third embodiment of an adjusting structure according to the present invention.

Referring now to the drawings, FIG. 1 fragmentarily shows one side of the roof assembly adjacent the front end of the roof assembly, the front end being omitted and FIG. 1 only showing sufficient structure to afford a clear understanding of the invention. The structure illustrated in FIG. 1 includes a gutter 1 for rain and an elongated profiled member 2 which is fixed to and extends along the gutter 1 as, for example, by being welded to the gutter 1. The structure further includes a frame 3 for strengthening the assembly and the sheet 4 of the roof is supported by the frame 3 which thus forms part of the frame for supporting the stationary roof 4.

The elongated profiled bar 2 forms a stationary support means which is part of the frame for the movable roof assembly, and this elongated bar 2 carries a guide rail 5 which extends along the bar 2, this guide rail 5 including a pair of guide sections 6 and 7 extending longitudinally of the rail 5 and between which the slide member 8 is guided for sliding movement. This slide member 8 carries the movable roof section 9. It is to be understood that the structure shown in FIG. 1 is duplicated on the other side of the roof assembly and that the section 9 is slidably supported at its opposite sides as well as its opposite ends in the manner illustrated in FIG. 1 so that it can be guided by the rail 5 for movement back and forth between open and closed positions.

In the illustration shown in FIG. 1 the guide rail 5 as well as the gutter 1 are broken away so that the front ends of these elements are not shown in FIG. 1, and elements 1 and 5 are broken away for the purpose of clearly showing the adjusting structure of the invention which is carried by the support means formed by the stationary frame member 2. This adjusting means in the example shown in FIG. 1 and on an enlarged scale in FIG. 2 includes the screw 10.

In the event that the roof section 9 does not have its curvature conforming properly to the curvature of the roof frame, it is possible for the operator to turn the screw 10 at each side of the frame, and inasmuch as the head of the screw 10 bears against the underside of the rail 5, as is evident from FIG. 2, the rail 5 will assume an elevation determined by the screw 10, and in this way it is possible to adjust the elevation of the roof section 9 since the slide member 8 will have its elevation determined by the elevation of the rail 5. As is apparent from FIG. 2 the rail 5 is formed with an opening in the form of a hole 11 directly over the head of the screw 10, this head having a diameter substantially larger than the opening 11, and this opening 11 is large enough to enable the tip of the screw driver to be placed through the opening 11 into engagement with the head of the screw 10 so that the latter can be turned to adjust the elevation of the rail 5. A nut 12 is fixed to a member which is fixedly carried by the elongated bar 2, so that the stationary nut 12 forms part of the support means to support the screw 10 for vertical movement in response to turning thereof.

In order to guarantee that the rail 5 bears against the head of the screw 10, a pair of screws are provided respectively before and after the screw 10 and fixing the rail 5 to the bar 2. One such screw 13 is shown in FIG. 1 behind the screw 10, and a similar screw is located forwardly of the screw 10. It is preferred to locate the screw 10 adjacent the front end of the assembly so that the rail 5 has its height adjusted adjacent the front end thereof.

The adjusting means illustrated in FIG. 3 differs from that of FIGS. 1 and 2 in that the adjusting screw 14 has an upper relatively small head portion 15 located in an opening of the rail 5 which corresponds to the opening 11, and beneath the portion 15 and the head of the screw 14 has a larger portion 17 engaging the underside of the rail 5 in the manner illustrated in FIG. 3. Thus, with this construction except for the slot 16 for receiving the screw driver the upper surface of the rail 5 is perfectly smooth. In the embodiment of FIG. 3 instead of a separate carrier for the nut, the bar 2 itself is formed with an opening through which the nut 18 extends so as to be directly carried by the bar 2 in the manner illustrated in FIG. 3, the nut 18 being fixed in any suitable way to the bar 2, as, for example, by being welded thereto.

With the embodiment of FIG. 4 the bar 2 carries a nut in a side wall, as illustrated in FIG. 4, and this nut threadedly carries a screw 19 to which an eccentric 20 is fixed, eccentric 20 engaging the underside of the rail 5, so that in response to turning of the screw 19 about its horizontal axis the eccentric 20 will be turned in order to raise or lower the portion of the rail 5 engaging the eccentric 20. The head of screw 19 is accessible through an opening produced by cutting out a portion of rail 5 as will be clear from FIG. 4. Of course, in the case of the embodiment of FIG. 4 as well as FIG. 3 there are also a pair of screws 13 located before and behind the structure shown in FIGS. 3 and 4 fixing the rail 5 to the elongated support 2. The eccentric 20 is fixed to the screw 19 in any suitable way as, for example, by a cross pin which extends through a bore of the eccentric 20 as well as through a bore of the screw 19.

It will be understood that each of the elements described above, or two or more together, may also find a useful application in other types of movable roof assemblies differing from the types described above.

While the invention has been illustrated and described as embodied in adjustments for movable roof assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shiftable roof assembly for automobiles or the like, in combination, support means; an elongated guide rail carried by said support means and guiding a movable roof section; and a screw member threadedly carried by said support means and having a head engaging said rail for adjusting the elevation of the latter, said rail being formed with an opening located over and aligned with said head so that the latter is accessible through said rail for adjustment of the screw member, the diameter of said head being larger than the diameter of said opening.

2. A combination as set forth in claim 1, wherein the head of said screw member comprises a first portion of relatively small diameter located in said opening and a second portion of larger diameter extending radially beyond said first portion and engaging said rail at the underside thereof.

3. A combination as set forth in claim 1, further comprising a pair of additional screw members fixing said rail to said support means, said first mentioned screw member being located between said additional screw members.

4. In a roof structure for automotive vehicles and the like, in combination, a stationary roof portion; a movable roof portion; a supporting member fixed to said stationary roof portion; a rail for slidably guiding said movable roof portion with respect to said stationary roof portion, said rail mounted on and located above said supporting member; and elevation adjusting means carried by said support member and cooperating with said rail for substantially vertically adjusting the position of said rail with respect to said stationary member and for thereby adjusting the position of said movable roof portion with respect to said stationary roof portion, said rail having an opening through which said elevation adjusting means is accessible for adjustment while said elongated horizontal guide rail is carried by said support means.

5. In a shiftable roof assembly for automobiles or the like, in combination, support means; an elongated guide rail carried by said support means, said guide rail extending in substantially horizontal direction and being adapted to guide a movable roof section; and elevation adjusting means carried by said support means and cooperating with said guide rail for adjusting the elevation of the latter, said guide rail having an opening through which said elevation adjusting means is accessible for adjustment while said elongated horizontal guide rail is carried by said support means.

6. A combination as set forth in claim 5, wherein said elevation adjusting means is in the form of screw means threadedly carried by said support means.

7. A combination as set forth in claim 5, wherein said elevation adjusting means is in the form of an eccentric turnably carried by said support means for rotation about an axis extending transversely of said guide rail.

8. In a shiftable roof assembly for automobiles or the like, in combination, support means; an elongated guide rail carried by said support means and having a front end portion, said guide rail extending in substantially horizontal direction and being adapted to guide a movable roof section; and elevation adjusting means carried by said support means and cooperating with said guide rail adjacent said front end portion of the guide rail for adjusting the elevation of the latter, said guide rail having an opening through which said elevation adjusting means is accessible for adjustment while said elongated horizontal guide rail is carried by said support means.

References Cited in the file of this patent

UNITED STATES PATENTS

| 1,680,886 | Janoir | Aug. 14, 1928 |
| 2,190,462 | Votypka | Feb. 13, 1940 |

FOREIGN PATENTS

| 198,144 KL63c2 2/40 | Austria | June 10, 1958 |
| 349,185 | Great Britain | May 28, 1931 |
| 320,636 KL 126b | Switzerland | May 15, 1957 |